(12) United States Patent
Waters

(10) Patent No.: US 7,844,145 B1
(45) Date of Patent: Nov. 30, 2010

(54) MEMS-BASED MULTI-CHANNEL FABRY-PEROT INTERFEROMETER SYSTEM WITH INCREASED TUNING RANGE AND RESOLUTION

(75) Inventor: Richard L. Waters, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 407 days.

(21) Appl. No.: 12/102,698

(22) Filed: Apr. 14, 2008

(51) Int. Cl.
*G02B 6/00* (2006.01)
*G02B 6/28* (2006.01)

(52) U.S. Cl. .................. 385/24; 385/147; 359/308

(58) Field of Classification Search ............ 385/21, 385/24, 25, 147; 359/579, 578, 586, 589, 359/308; 356/328, 454, 519, 480
See application file for complete search history.

(56) References Cited

U.S. PATENT DOCUMENTS

| | | | |
|---|---|---|---|
| 6,327,036 B1 | 12/2001 | Bao et al. | |
| 6,339,603 B1 | 1/2002 | Flanders et al. | |
| 6,590,710 B2 * | 7/2003 | Hara et al. | 359/579 |
| 6,888,661 B1 | 5/2005 | Islam et al. | |
| 7,061,618 B2 | 6/2006 | Atia et al. | |
| 7,573,578 B2 * | 8/2009 | Zribi et al. | 356/454 |
| 2001/0055119 A1 * | 12/2001 | Wood et al. | 356/519 |
| 2003/0063843 A1 * | 4/2003 | Horne | 385/24 |
| 2005/0030533 A1 * | 2/2005 | Treado | 356/326 |
| 2005/0264808 A1 * | 12/2005 | Wang | 356/328 |
| 2006/0061852 A1 * | 3/2006 | Chu et al. | 359/308 |
| 2007/0097694 A1 | 5/2007 | Faase et al. | |

* cited by examiner

*Primary Examiner*—Akm E Ullah
(74) *Attorney, Agent, or Firm*—Ryan J. Friedl; Kyle Eppele

(57) ABSTRACT

A system includes a first Fabry-Perot interferometry channel and a second Fabry-Perot interferometry channel serially and optically coupled to the first Fabry-Perot interferometry channel. One channel of the first and second Fabry-Perot interferometry channels has a greater tuning range than the other channel of the first and second Fabry-Perot interferometry channels. The Fabry-Perot interferometry channel having the lesser tuning range has a greater tuning precision than the Fabry-Perot interferometry channel having the greater tuning range. The system may be included in a MEMS-based system, such as a MEMS spectrometer.

17 Claims, 7 Drawing Sheets

MEMS-BASED MULTI-CHANNEL FABRY-PEROT INTERFEROMETER SYSTEM WITH INCREASED TUNING RANGE AND RESOLUTION

FEDERALLY-SPONSORED RESEARCH AND DEVELOPMENT

The MEMS-Based Multi-Channel Fabry-Perot Interferometer System with Increased Tuning Range and Resolution was developed with funds from the United States Department of the Navy. Licensing inquiries may be directed to Office of Research and Technical Applications, Space and Naval Warfare Systems Center, San Diego, Code 2112, San Diego, Calif., 92152; telephone 619-553-2778; email: T2@spawar.navy.mil, reference Navy Case No. 98184.

BACKGROUND

Micro-Electro-Mechanical Systems (MEMS) involve the integration of mechanical elements, sensors, actuators, and electronics on a common silicon substrate through microfabrication technology. The electronics are generally fabricated using integrated circuit (IC) process sequences (e.g., CMOS, Bipolar, or BICMOS processes). The micro-mechanical components are generally fabricated using compatible "micro-machining" processes that selectively etch away parts of the silicon wafer or add new structural layers to form the mechanical and electro-mechanical devices.

MEMS spectrometers are attractive for their small size and weight as well as low cost. The ability to create high quality interferometers with a high tuning range and resolution for spectrometers used in chemical and/or biological identification has proven to be difficult. New MEMS-based interferometry technology is desirable.

DETAILED DESCRIPTION OF SOME EMBODIMENTS

Figure 1:
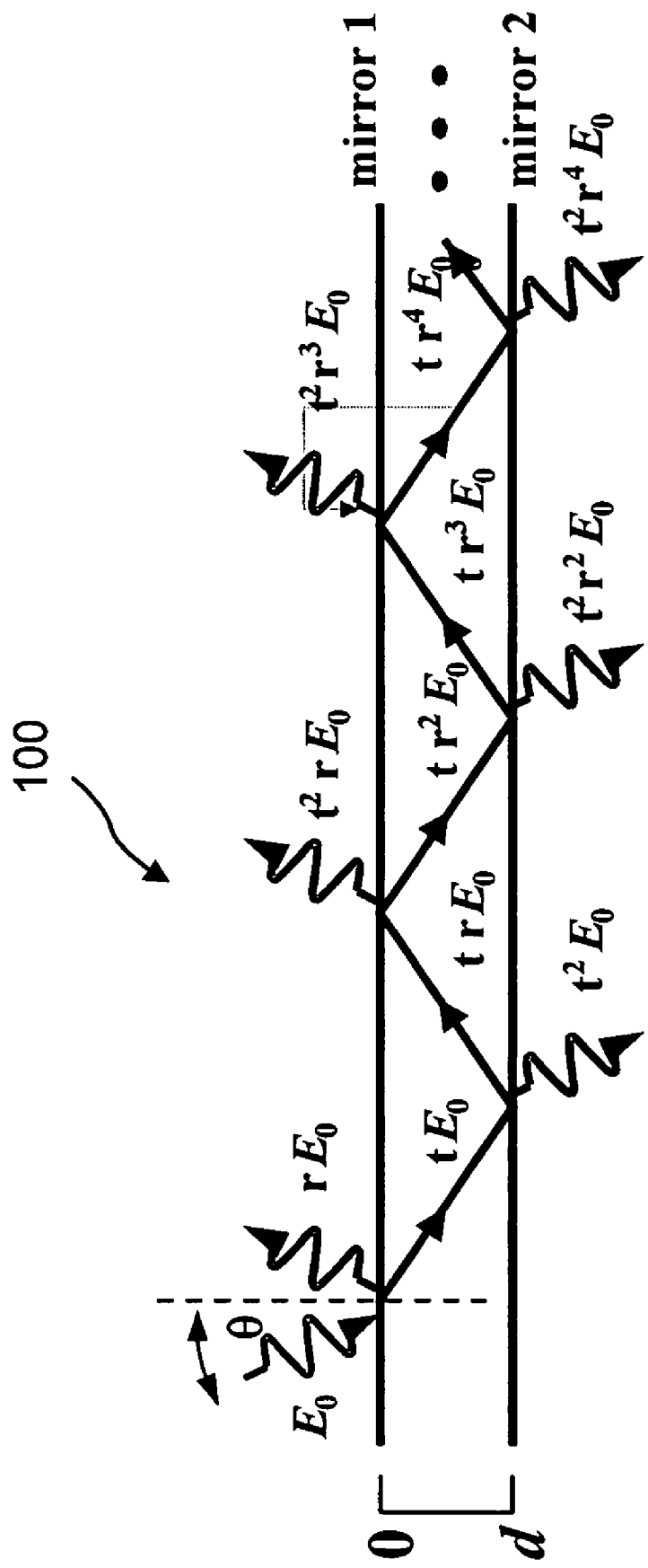
FIG. 1 shows a diagram illustrating the basic functionality of a Fabry-Perot interferometer.

FIG. 1 shows a general example of a Fabry-Perot interferometer (FPI) 100 that includes a set of optically flat and parallel partially transmissive mirrors (mirror 1 and mirror 2). The distance between the mirrors, d, may be independently varied. In operation, the specific spacing between various mirrors may determine the wavelength of light that is transmitted. For fixed mirror spacing, delta, the maximum transmission as a function of wavelength, occurs for multiples of $\lambda/2$ where $\lambda$ is the desired wavelength. This, however, implies that multiple wavelengths will be preferentially transmitted through the Fabry-Perot channel. The multiple wavelengths may be indistinguishable from one another.

The range of wavelengths that may be uniquely distinguished is called the Free Spectral Range (FSR) of the optical channel and is calculated by equation (1) below:

$$FSR = \Delta f = \frac{c}{2nd \cos(\theta)} \quad (1)$$

The FSR is inversely proportional to channel spacing, d, so that as the channel spacing becomes smaller, the FSR becomes larger. The Resolving Power (RP), i.e., the resolution, may be described by equation (2) below:

$$RP = \frac{\lambda}{\Delta\lambda} = NF = N\frac{4R}{(1-R)^2} = \frac{2nd}{\lambda}\frac{4R}{(1-R)^2} \quad (2)$$

where $$\Delta\lambda = \frac{\lambda^2}{2nd} \quad (3)$$

and $$\Delta k = \frac{2\pi\Delta f}{c} \quad (4)$$

The Resolving Power (RP) of an FPI is the ability to resolve an incremental change in wavelength. The RP, unlike the FSR, is proportional to the distance between the mirrors, d. This implies that for a typical Fabry-Perot channel, the FSR may be increased but at the expense of the RP. Conversely, the RP may be increased at the expense of the FSR. The ability to obtain large RPs using a FPI channel is limited by mirror fabrication capabilities using MEMS processing technology. In general, higher mirror qualities result in high RPs, but smaller tuning range.

Figure 2:
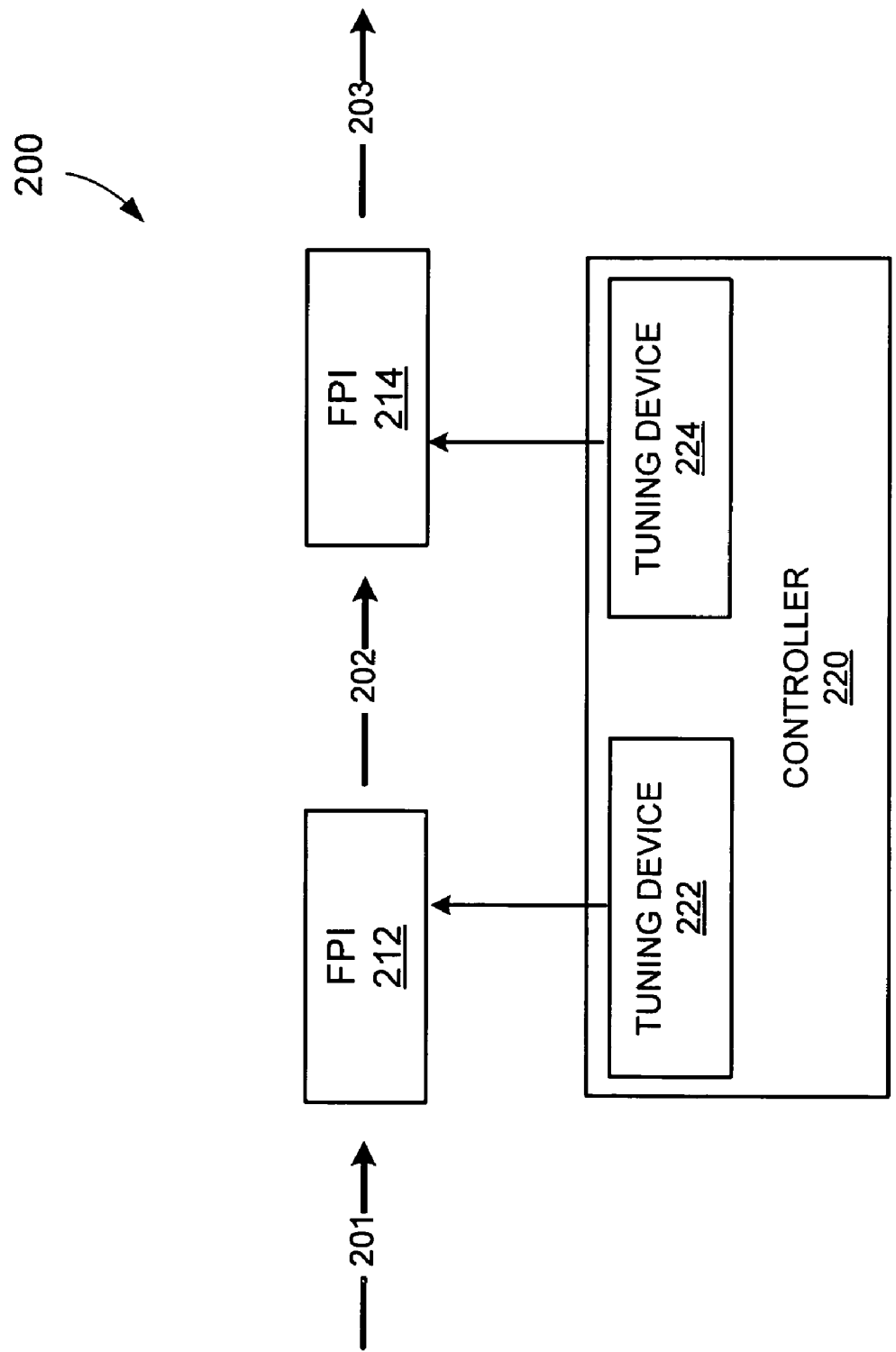
FIG. 2 shows a block diagram of an embodiment of the MEMS-Based Multi-Channel Fabry-Perot Interferometer System with Increased Tuning Range and Resolution.

FIG. 2 shows a block diagram of a multi-channel FPI system 200. FPI system 200 includes a first FPI channel 212 serially and optically coupled to a second FPI channel 214. System 200 includes a controller 220 having a first tuning device 222 for tuning FPI channel 212 and a second tuning channel 224 for tuning FPI channel 214. In some embodiments, system 200 may have one controller for controlling the tuning of both FPI channels 212 and 214. In some embodiments, system 200 may have one tuning device for tuning both FPI channels 212 and 214. One of FPI channels 212 or 214 has a greater tuning range over the other FPI channel 212 or 214, while the other FPI channel 212 or 214 has a greater tuning precision over the FPI channel 212 or 214 having the greater tuning range.

System 200 operates by receiving optical energy 201 at an input of FPI channel 212. Optical energy 201 may be emitted from an optical energy source, such as a laser or light emitting diode. FPI channel 212 processes optical energy 201 into an intermediate optical energy 202, which exits FPI channel 212 and is delivered to an input of FPI channel 214. FPI channel 214 processes optical energy 202 into output optical energy 203 and outputs optical energy 203. In some embodiments, optical energy 203 may be output to a component, such as a sensor, located within a MEMS-based system.

Figure 6:
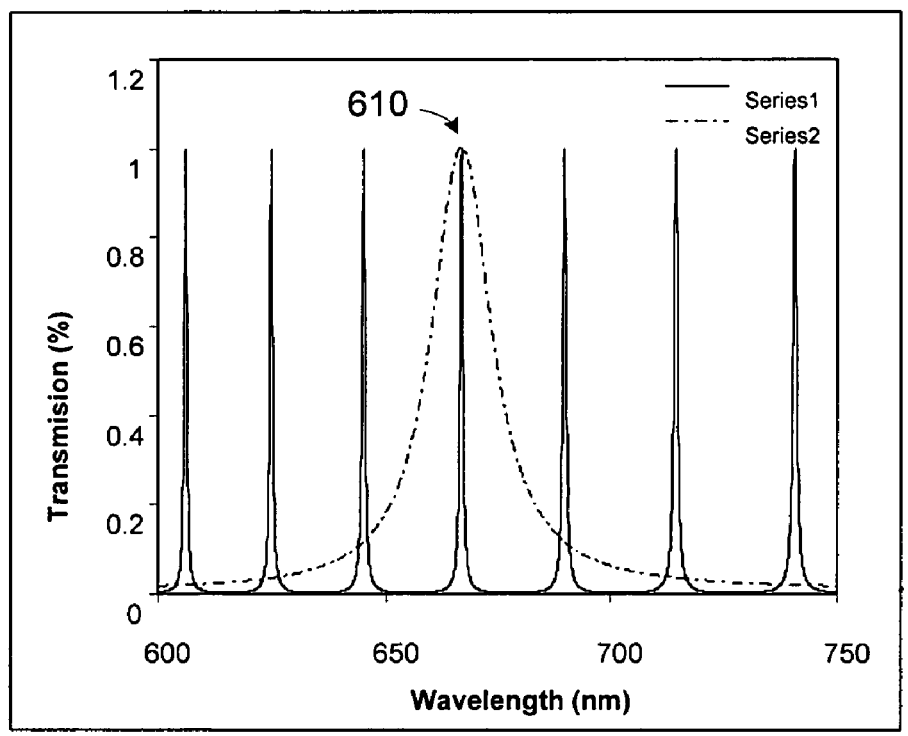
FIG. 6 shows a graph of the functionality of the two separate multi-channel Fabry-Perot interferometer channels of FIGS. 2-4.

FIG. 6 shows a graph illustrating the transmission of wavelengths through each of a respective first and second FPI channels, such as FPI channels 212 and 214, as a function of wavelength, where the mirror spacing for FPI channel 214 (see series 2) is ten times that for FPI channel 212 (see series 1). This implies that the FSR of the more closely spaced channel (FPI channel 212) is ten times larger than the FSR of the larger spaced channel (FPI channel 214). However, the RP of FPI channel 214 is ten times larger than for FPI channel 212. By serially coupling the two FPI channels, the greater FSR of the more closely spaced channel and the greater RP of the larger spaced channel may be utilized.

Referring back to FIG. 2, the peak transmissions, i.e. spacing, of each FPI channel 212 and 214 may be tuned in unison during operation such that, for example, the peak transmissions of series 1 and series 2, as shown by reference 610 in FIG. 6, track each other. As a result, one of both FPI 212 and FPI 214 yields a relatively larger tuning range, while the other of both FPI 212 and FPI 214 yields a relatively higher resolving power.

To keep FPI channels 212 and 214 appropriately tuned, tuning devices 222 and 224 may be configured such that FPI channels 212 and 214 are commonly controlled to dynamically track to a desired common optical wavelength. As an example, the desired common optical wavelength is shown in FIG. 6 as peak wavelength 610. The effect of such tuning may be seen in FIG. 7, which shows the series connection, i.e. multiplication, of the two transmission curves of FIG. 6, including the spectral peak 710 corresponding to the wavelength 610 of FIG. 6.

Figure 3:
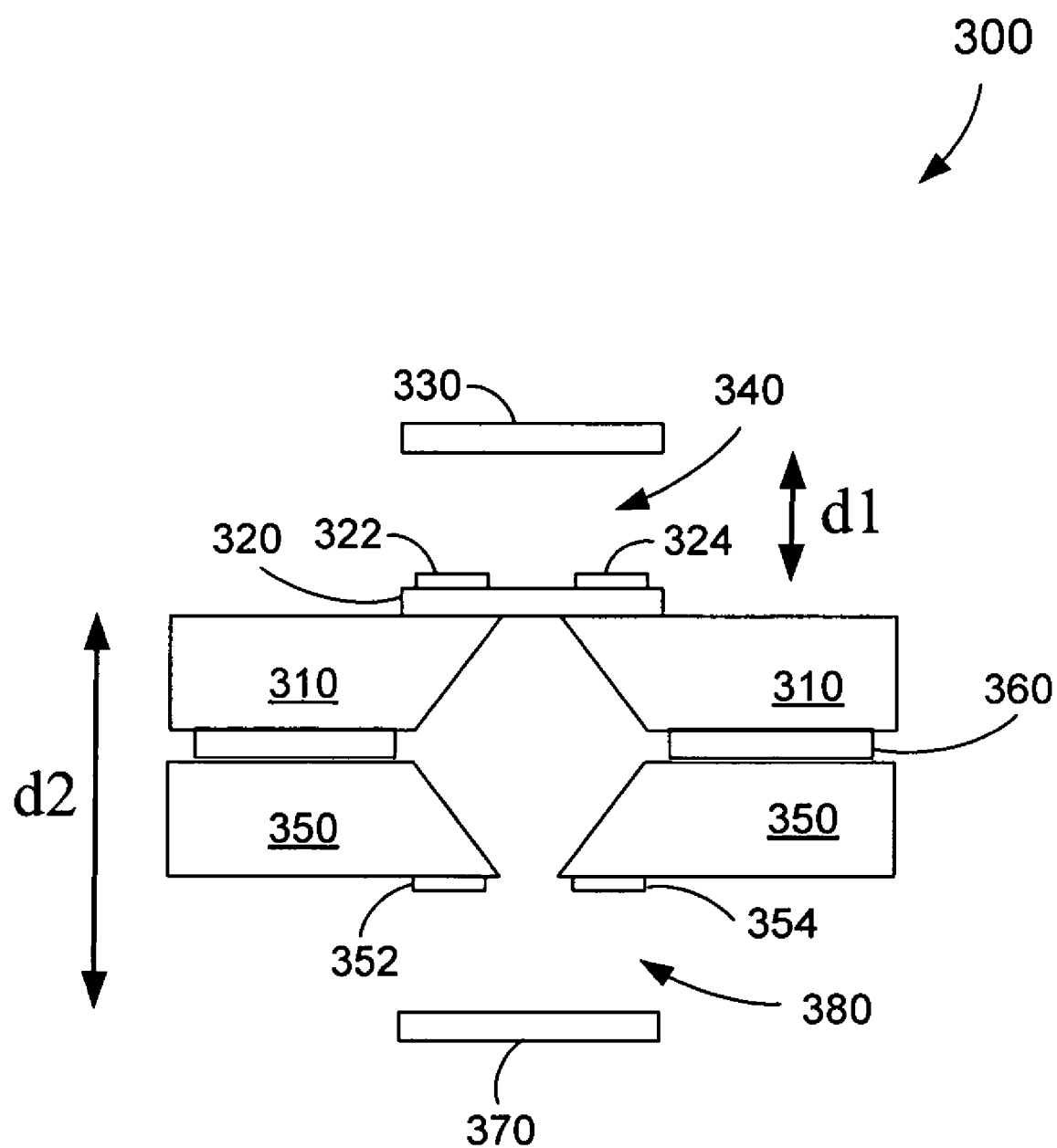
FIG. 3 shows a cross-section view of an embodiment of the MEMS-Based Multi-Channel Fabry-Perot Interferometer System with Increased Tuning Range and Resolution.

FIG. 3 shows a cross-section view of an embodiment of a multi-channel FPI system located within a MEMS system 300. System 300 may include a substrate having a first side and a second side, a first interferometry channel 340 located in relation to the first side, and a second interferometry channel 380 located in relation to the second side. The second interferometry channel 380 is serially and optically coupled to the first interferometry channel 340. In some embodiments, first interferometry channel 340 and the second interferometry channel 380 may be FPI channels. In some embodiments, the substrate may be a single substrate, or may be two substrates bonded together, such as substrates 310 and 350 shown in FIG. 3.

First interferometry channel 340 is formed between a first mirror 320 and a second mirror 330. First mirror 320 is disposed on a substrate 310. First mirror 320 may have electrodes 322 and 324 coupled thereto. Second mirror 330 may be separated from first mirror 320 by a distance, d1. Second mirror 330 may be movable such that distance d1 may either increase or decrease, increasing or decreasing the spacing of first interferometry channel 340.

Second interferometry channel 380 is formed between first mirror 320 and a third mirror 370. Substrate 310 may be bonded to a second substrate 350 by bonding material 360. Substrate 350 may have electrodes 352 and 354 coupled thereto. Third mirror 370 may be separated from first mirror 320 by a distance, d2. Third mirror 370 may be movable such that distance d2 may increase or decrease, increasing or decreasing the spacing of second interferometry channel 380.

First and second interferometry channels 340 and 380 may both be commonly controlled to dynamically track to a desired common optical wavelength. When located within MEMS system 300, first interferometry channel 340 and second interferometry channel 380 may be commonly controlled via respective electrostatic charges. As a result, the multi-channel interferometry system may be controlled to a high degree of precision.

Figure 4:
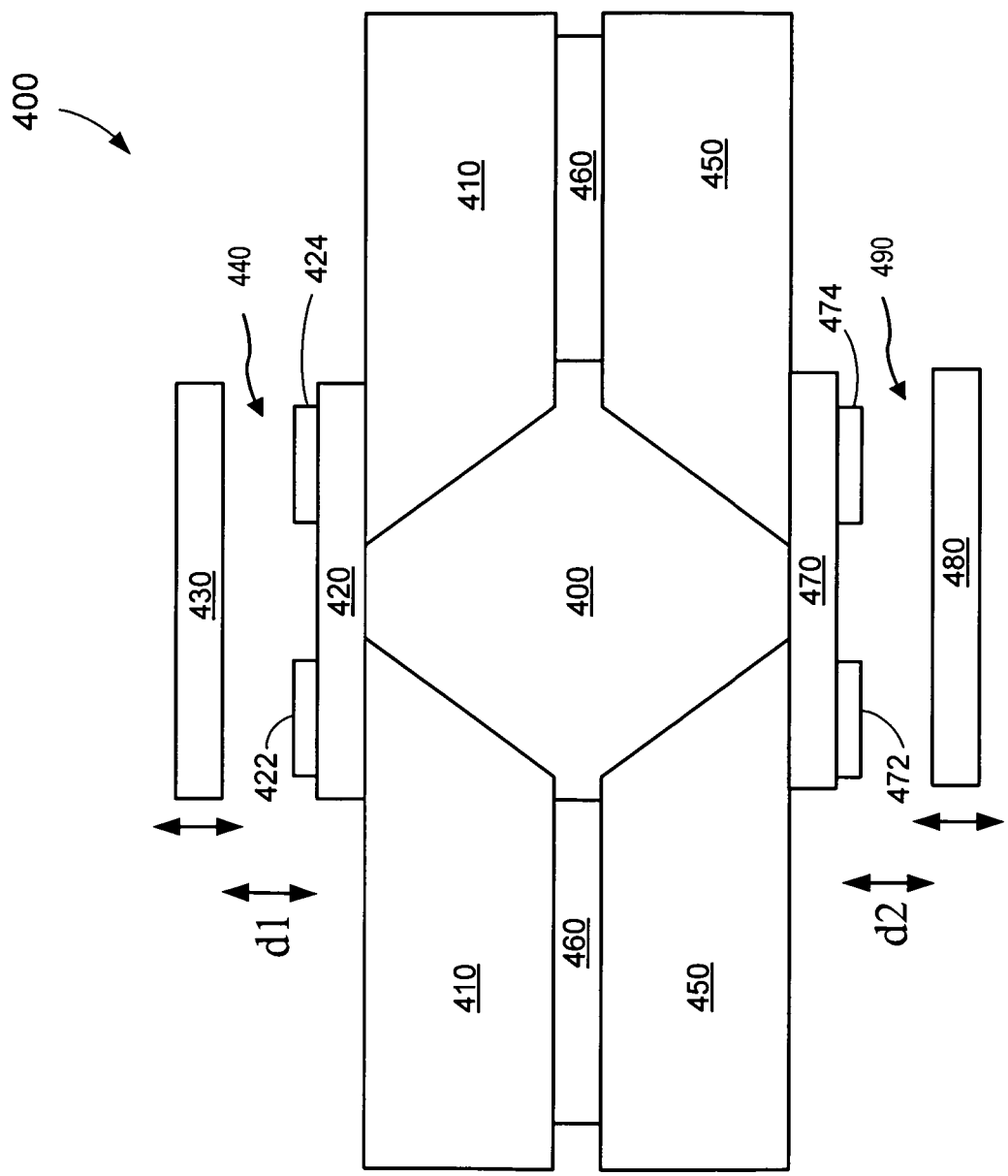
FIG. 4 shows a cross-section view of an embodiment of the MEMS-Based Multi-Channel Fabry-Perot Interferometer System with Increased Tuning Range and Resolution.

FIG. 4 shows a cross-section view of an embodiment of a multi-channel FPI system located within a MEMS system 400. A first FPI channel 440 is formed between a first mirror 420 and a second mirror 430. First mirror 420 is disposed on a substrate 410. First mirror 420 may have electrodes 422 and 424 coupled thereto. Second mirror 430 may be separated from first mirror 420 by a distance, d1. Second mirror 430 may be movable such that distance d1 may either increase or decrease, increasing or decreasing the spacing of FPI channel 440.

A second FPI channel 490 is formed between a third mirror 470 and a fourth mirror 480. Substrate 410 may be bonded to a second substrate 450 by bonding material 460, such as bonding cement. Third mirror 470 may be coupled to substrate 450. Third mirror 470 may have electrodes 472 and 474 coupled thereto. Fourth mirror 480 may be separated by third mirror 470 by a distance, d2. Fourth mirror 480 may be movable such that distance d2 may either increase or decrease, increasing or decreasing the spacing of second FPI channel 490.

First and second FPI channels 440 and 490 may both be commonly controlled to dynamically track to a desired common optical wavelength. When located within MEMS system 400, first FPI channel 440 and second FPI channel 490 may be commonly controlled via respective electrostatic charges. As a result, the multi-channel FPI system may be controlled to a high degree of precision.

Although systems 200, 300, and 400 are shown with only a first and a second FPI channel, each of systems 200, 300, and 400 may contain any number of serially and optically coupled FPI channels, such as 3, 4, etc. . . . , to provide a system having specified tuning and resolution capabilities.

Figure 5:
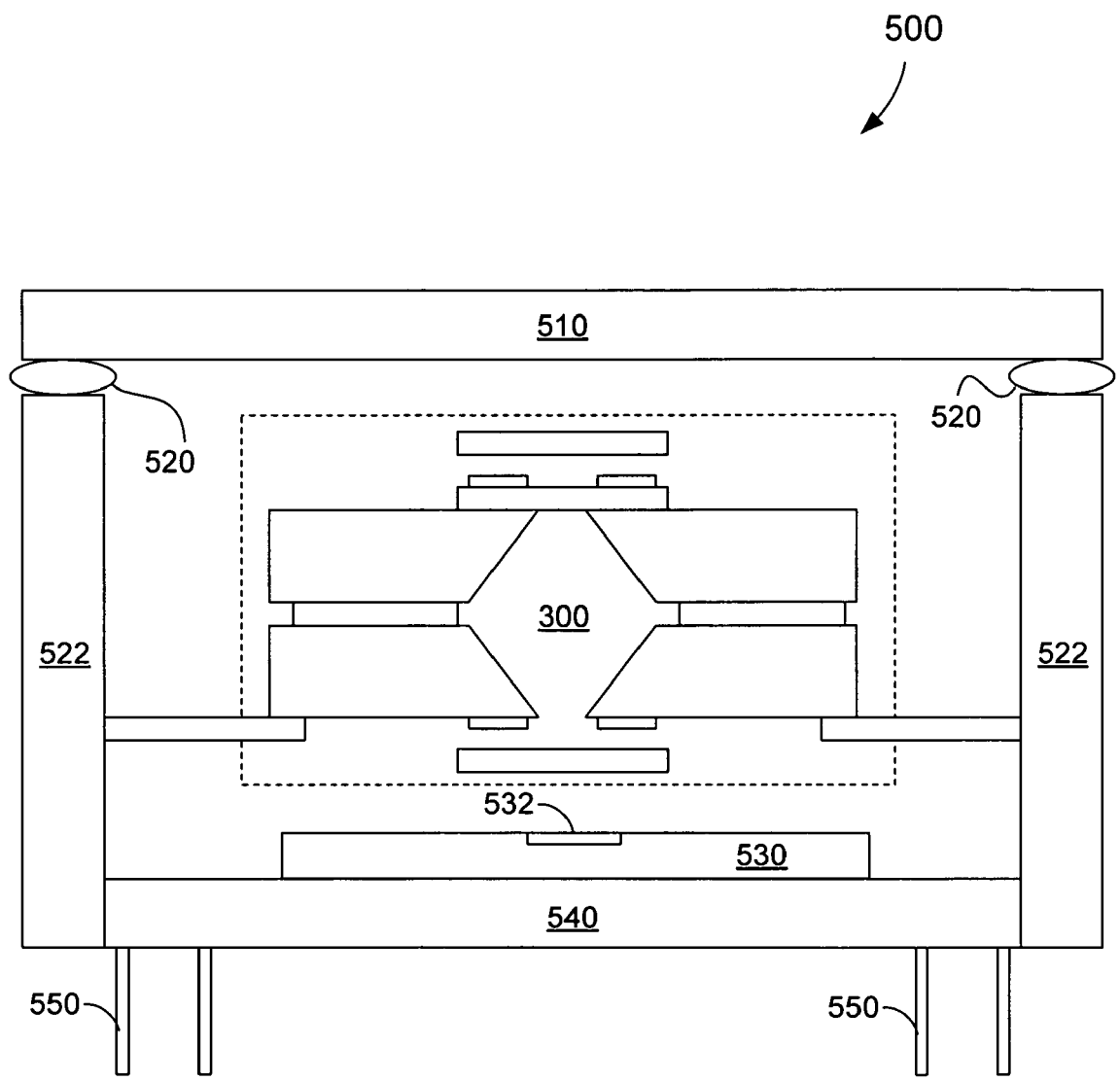
FIG. 5 shows a cross-section view of an embodiment of a packaged MEMS-Based Multi-Channel Fabry-Perot Interferometer System with Increased Tuning Range and Resolution.

FIG. 5 shows a cross-section view of a packaged FPI device 500. Device 500 includes device 300, as shown in FIG. 3, surrounded by substrates 510, 522 (left and right) and 540. Top substrate 510 is bonded to side substrates 522 using bonding agents 520. Device 500 includes a substrate 530 having reflective surface 532.

Figure 8:
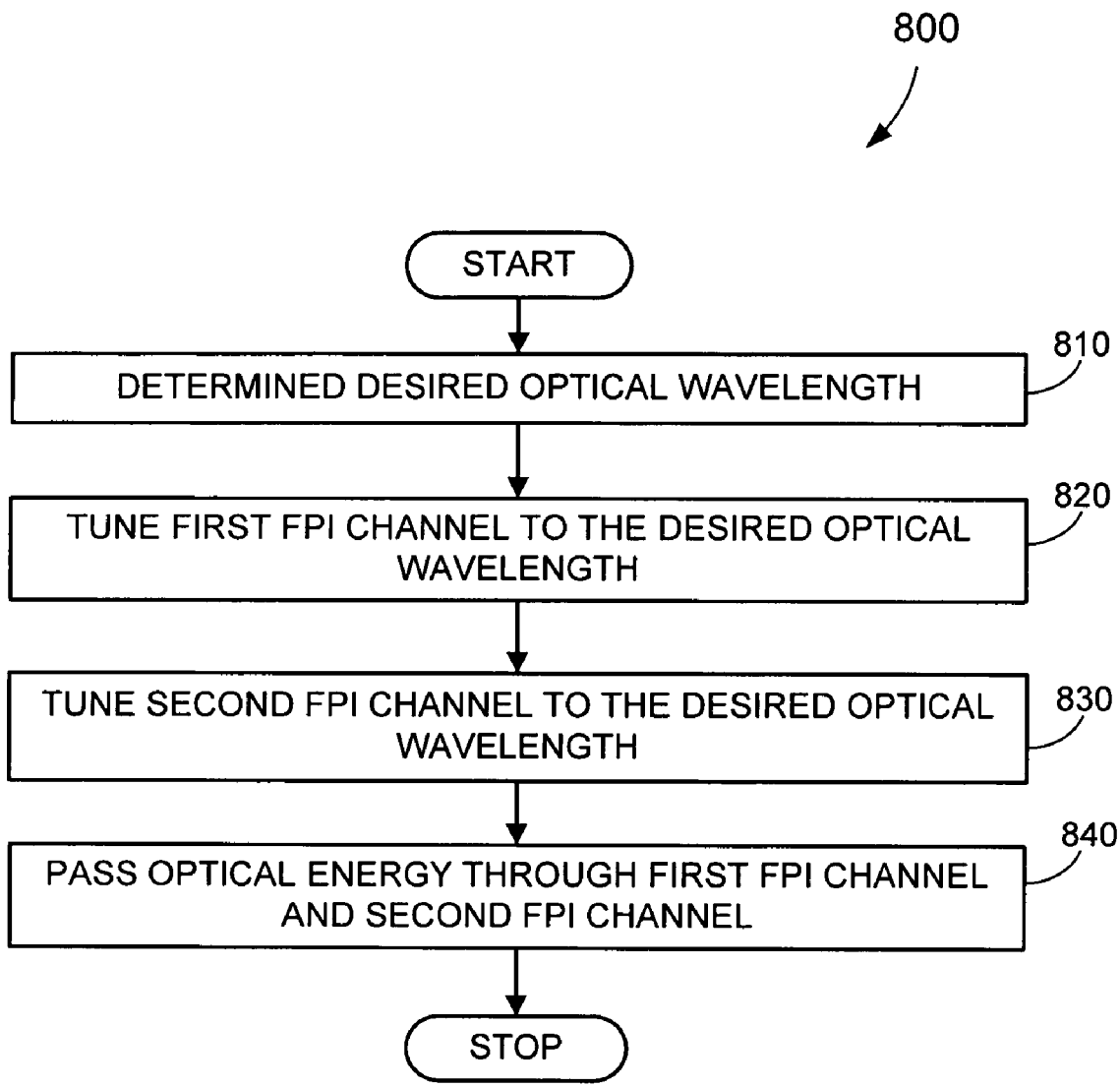
FIG. 8 shows a flowchart of an embodiment of a method for the MEMS-Based Multi-Channel Fabry-Perot Interferometer System with Increased Tuning Range and Resolution.

FIG. 8 shows a flowchart of a method 800 for the MEMS-Based Multi-Channel Fabry-Perot Interferometer System with Increased Tuning Range and Resolution. Method 800 may be used within multi-channel interferometry systems, including MEMS-based systems, such as systems 200, 300, 400, and 500 discussed herein. For illustration purposes, method 800 will be discussed with reference to system 200.

Figure 7:
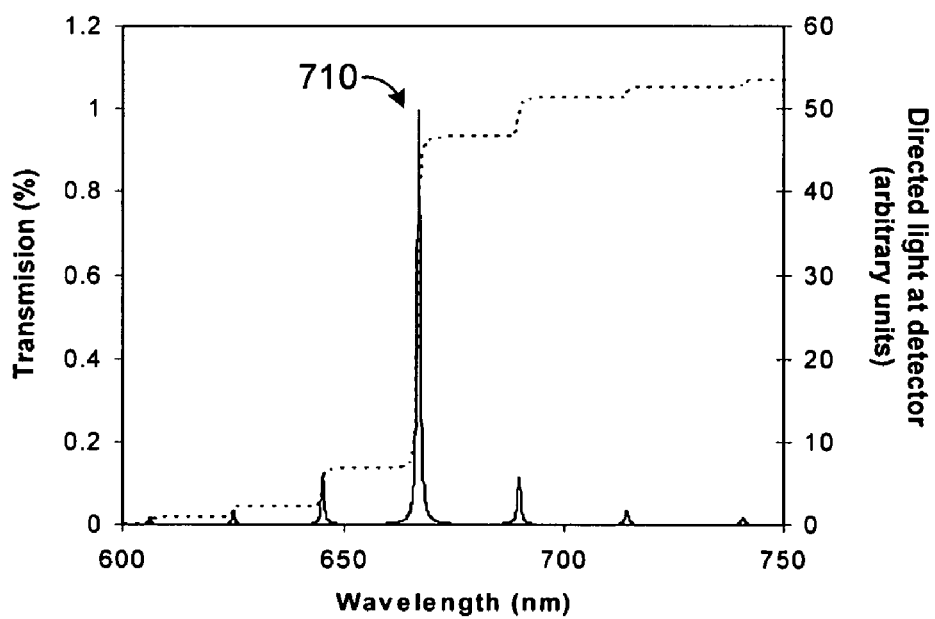
FIG. 7 shows a graph of the overall transfer function of the exemplary multi-channel Fabry-Perot interferometer of FIGS. 2-4.

Method 800 may begin at step 810, where a desired optical wavelength is determined. As an example, the desired optical wavelength may be the wavelength represented by peak 710 as shown in FIG. 7. Next, step 820 involves tuning a first FPI channel to the desired optical wavelength. As shown in FIG. 2, FPI channel 212 may be tuned to the desired optical wavelength by tuning device 222. Method 800 may then proceed to step 830, which involves tuning the second FPI channel to the desired optical wavelength. As shown in FIG. 2, FPI channel 214 may be tuned to the desired optical wavelength by tuning device 224. Next, step 840 involves passing optical energy serially through the first FPI channel and the second FPI channel. As shown in FIG. 2, optical energy 201 passes through FPI 212, optical energy 202 enters FPI 214, and optical energy 203 exits FPI 214.

Method 800 may be implemented using a programmable device, such as a computer-based system. Method 800 may be implemented using any of various known or later developed programming languages, such as "C", "C++", "FORTRAN", Pascal", "VHDL" and the like.

Various computer-readable storage mediums, such as magnetic computer disks, optical disks, electronic memories and the like, may be prepared that may contain instructions that direct a device, such as a computer-based system, to implement the steps of method 800. Once an appropriate device has access to the instructions and contained on the computer-readable storage medium, the storage medium may provide the information and programs to the device, enabling the device to perform method 800.

As an example, if a computer disk containing appropriate materials, such as a source file, an object file, or an executable file were provided to a computer, the computer could receive the information, appropriately configure itself and perform the steps of method 800. The computer could receive various portions of information from the disk relating to different steps of method 800, implement the individual steps, and coordinate the functions of the individual steps.

Many modifications and variations of the MEMS-Based Multi-Channel Fabry-Perot Interferometer System with Increased Tuning Range and Resolution are possible in light of the above description. Therefore, within the scope of the appended claims, the MEMS-Based Multi-Channel Fabry-Perot Interferometer System with Increased Tuning Range and Resolution may be practiced otherwise than as specifically described. Further, the scope of the claims is not limited to the implementations and embodiments disclosed herein, but extends to other implementations and embodiments as may be contemplated by those having ordinary skill in the art.

What is claimed is:

1. A system, comprising:
a first Fabry-Perot interferometry channel having a first free spectral range (FSR) and a first resolving power (RP);
a second Fabry-Perot interferometry channel having a second FSR and a second RP, serially and optically coupled to the first Fabry-Perot interferometry channel, wherein the first FSR is greater than the second FSR and the first RP is less than the second RP, wherein the first and second FSR are calculated by the equation $$\Delta f = \frac{c}{2nd \cos(\theta)}$$

and the first and second RP are calculated by the equation $$RP = \frac{\lambda}{\Delta \lambda} = NF = N\frac{4R}{(1-R)^2} = \frac{2nd}{\lambda}\frac{4R}{(1-R)^2},$$

$$\text{where } \Delta\lambda = \frac{\lambda^2}{2nd} \text{ and } \Delta k = \frac{2\pi\Delta f}{c};$$

and
a controller configured to commonly control the first Fabry-Perot interferometry channel and the second Fabry-Perot interferometry channel in unison to dynamically track an optical wavelength.

2. The system of claim 1, wherein the first and second Fabry-Perot interferometry channels are located within a MEMS system on opposite sides of a substrate.

3. The system of claim 1, wherein the first and second Fabry-Perot interferometry channels are controlled via respective electrostatic charges.

4. A system, comprising:
a substrate having a first side and a second side;
a first interferometry channel having a first FSR and a first RP, located in relation to the first side;
a second interferometry channel having a second FSR and a second RP, located in relation to the second side, the second interferometry channel being serially and optically coupled to the first interferometry channel, wherein the first FSR is greater than the second FSR and the first RP is less than the second RP, wherein the first and second FSR are calculated by the equation $$\Delta f = \frac{c}{2nd \cos(\theta)}$$

and the first and second RP are calculated by the equation $$RP = \frac{\lambda}{\Delta \lambda} = NF = N\frac{4R}{(1-R)^2} = \frac{2nd}{\lambda}\frac{4R}{(1-R)^2},$$

$$\text{where } \Delta\lambda = \frac{\lambda^2}{2nd} \text{ and } \Delta k = \frac{2\pi\Delta f}{c};$$

and
a controller configured to commonly control the first interferometry channel and the second interferometry channel in unison to dynamically track an optical wavelength.

5. A method comprising the step of:
determining an optical wavelength;
tuning a first Fabry-Perot interferometry channel and a second Fabry-Perot interferometry channel to the optical wavelength, wherein the first Fabry-Perot interferometry channel has a first FSR and a first RP and the second Fabry-Perot interferometry channel has a second FSR and a second RP, wherein the first FSR is greater than the second FSR and the first RP is less than the second RP, wherein the first and second FSR are calculated by the equation $$\Delta f = \frac{c}{2nd \cos(\theta)}$$

and the first and second RP are calculated by the equation $$RP = \frac{\lambda}{\Delta \lambda} = NF = N\frac{4R}{(1-R)^2} = \frac{2nd}{\lambda}\frac{4R}{(1-R)^2},$$

$$\text{where } \Delta\lambda = \frac{\lambda^2}{2nd} \text{ and } \Delta k = \frac{2\pi\Delta f}{c};$$

commonly controlling the first and second Fabry-Perot interferometry channels in unison to dynamically track to the optical wavelength; and
passing optical energy serially through the first and second Fabry-Perot interferometry channels.

6. The method of claim 5, wherein the first and second Fabry-Perot interferometry channels are located within a MEMS system.

7. The method of claim 6, wherein the first and second Fabry-Perot interferometry channels are tuned via respective electrostatic charges.

8. The method of claim 6, wherein the first and second Fabry-Perot interferometry channels are located on opposite sides of a MEMS substrate.

9. A system, comprising:
a first interferometry channel having a first FSR and a first RP and formed by a first mirror and a second mirror;
a second interferometry channel having a second FSR and a second RP, formed by the second mirror and a third mirror, the second interferometry channel being serially and optically coupled to the first interferometry channel, wherein the first FSR is greater than the second FSR and the first RP is less than the second RP, wherein the first and second FSR are calculated by the equation $$\Delta f = \frac{c}{2nd\,\cos(\theta)}$$

and the first and second RP are calculated by the equation $$RP = \frac{\lambda}{\Delta\lambda} = NF = N\frac{4R}{(1-R)^2} = \frac{2nd}{\lambda}\frac{4R}{(1-R)^2},$$

$$\text{where } \Delta\lambda = \frac{\lambda^2}{2nd} \text{ and } \Delta k = \frac{2\pi\Delta f}{c};$$

and
a controller configured to commonly control the first interferometry channel and the second interferometry channel in unison to dynamically track an optical wavelength.

10. The system of claim 9, wherein the first mirror and the third mirror are movable with respect to the second mirror.

11. The system of claim 9, wherein the second mirror is coupled to a substrate, the first mirror is located in relation to one side of the substrate, and the third mirror is located in relation to the other side of the substrate.

12. The system of claim 1, wherein the controller comprises one tuning device for tuning both the first and second Fabry-Perot interferometry channels.

13. The system of claim 1, wherein the controller comprises a first tuning device for tuning the first Fabry-Perot interferometry channel and a second tuning device for tuning the second Fabry-Perot interferometry channel.

14. The system of claim 4, wherein the controller comprises one tuning device for tuning both the first and second Fabry-Perot interferometry channels.

15. The system of claim 4, wherein the controller comprises a first tuning device for tuning the first Fabry-Perot interferometry channel and a second tuning device for tuning the second Fabry-Perot interferometry channel.

16. The system of claim 9, wherein the controller comprises one tuning device for tuning both the first and second Fabry-Perot interferometry channels.

17. The system of claim 9, wherein the controller comprises a first tuning device for tuning the first Fabry-Perot interferometry channel and a second tuning device for tuning the second Fabry-Perot interferometry channel.

* * * * *